Dec. 27, 1932.　　　W. B. PINE　　　1,892,583
FEEDER FOR ARGILLACEOUS MATERIALS
Filed July 22, 1930
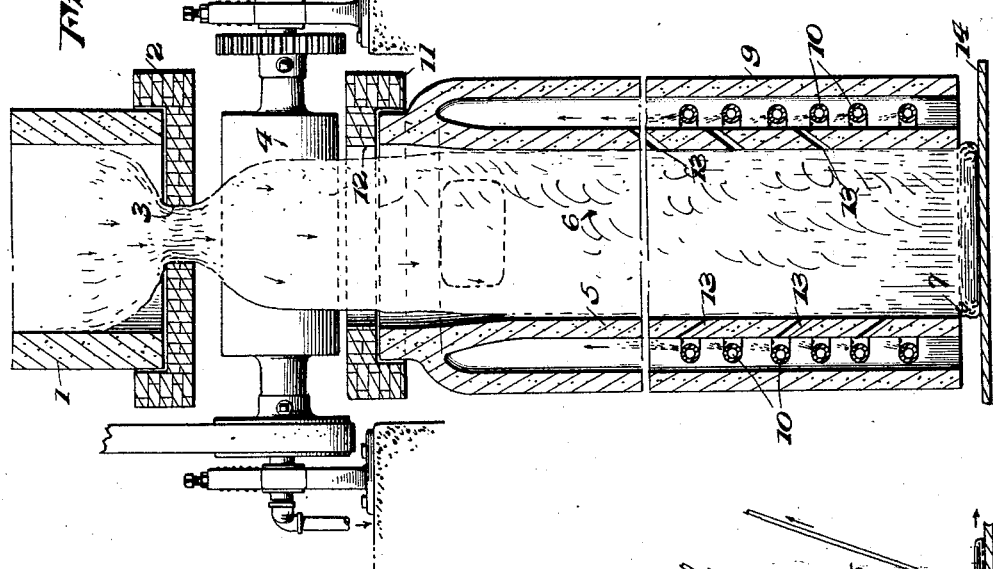
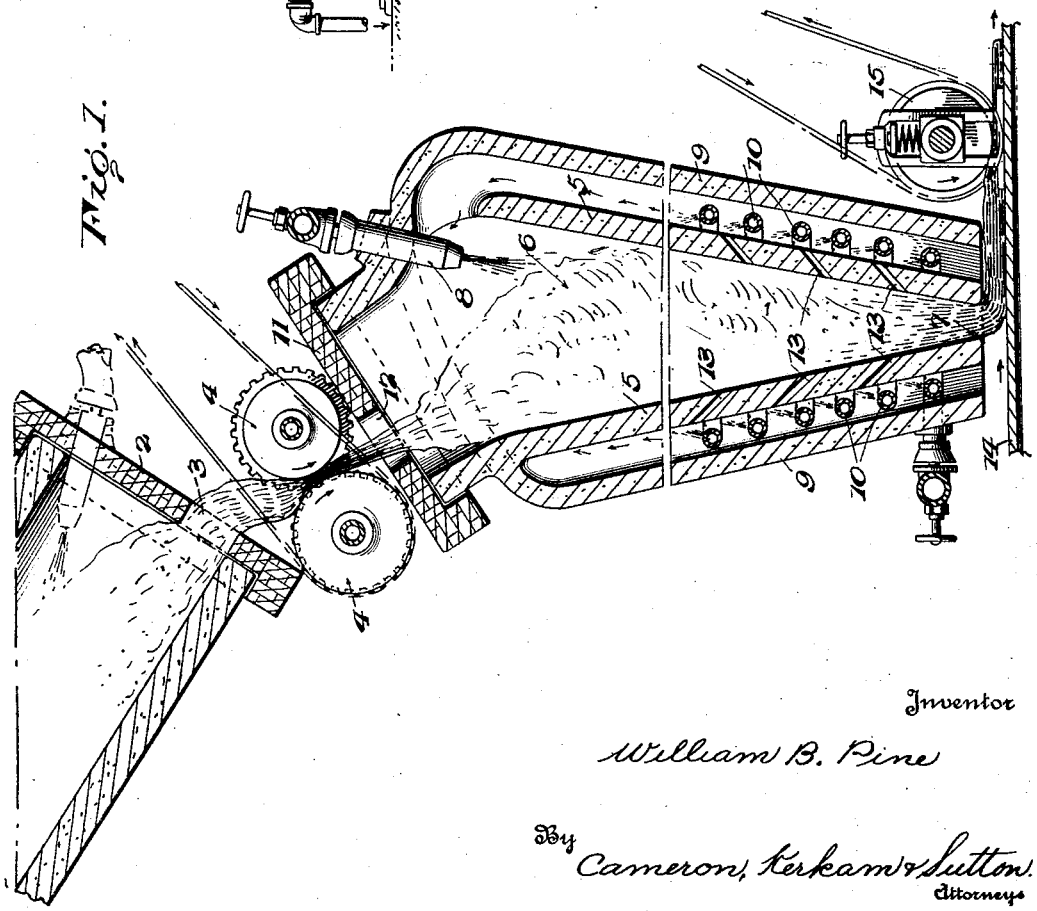
Inventor
William B. Pine
By Cameron, Kerkam & Sutton
Attorneys Patented Dec. 27, 1932

1,892,583

UNITED STATES PATENT OFFICE

WILLIAM B. PINE, OF OKMULGEE, OKLAHOMA

FEEDER FOR ARGILLACEOUS MATERIALS

Application filed July 22, 1930. Serial No. 469,905.

This invention relates to a process of and apparatus for the manufacture of products from argillaceous materials, particularly clays and shales.

It has been discovered that argillaceous materials, such as clay, shale and the like, when heated to a temperature at which said materials become plastic or semi-plastic but not completely fused, may be compacted and densified by the application of pressure while so heated and molded to form products having uniform composition and texture and being dense, hard and rock-like. The starting materials which may be treated in this manner include broadly argillaceous materials such as clay or shale of many varieties, either alone or mixed with suitable ingredients to aid or increase properties in which the clay or shale may be deficient. These materials, which may if desired be first crushed, ground or pulverized to any desired extent, are heated to a temperature at which they become plastic or semi-plastic but not fused, and while heated are molded to any desired shape, preferably under pressure which may be applied in any suitable manner as by rollers, dies and the like. The application of molding pressure compacts the hot material, decreasing the porosity of the resultant product and increasing its hardness and density.

When these materials are heated, a somewhat loose mass of plastic or semi-plastic material is obtained which is full of voids varying in size from relatively minute spaces to relatively large air or gas pockets, and more voids may be formed when the materials are oxidized or dehydrated quickly. In order to produce a product which is non-porous, hard, dense and compact, the hot materials must be compacted and the voids therein eliminated before or during the molding operation, while the materials are maintained in a hot plastic or semi-plastic state. By mechanically working or manipulating the hot material, as by rolling or kneading operations, the smaller or more minute voids between particles of the material and the small air pockets and the like may be worked out if desired before the materials are molded, but in feeding such materials the handling and working of the mass tends to create other voids therein which may be of substantial size. The presence of such voids is objectionable, particularly in continuous mechanical molding operations because it results in inequalities in the amount of material fed to the molds and hence in non-uniformity of the molded product.

One of the objects of the present invention is to provide a novel process and means for feeding a plastic or semi-plastic mass of hot argillaceous material of the character specified above, which means while maintaining the material in a plastic or semi-plastic state provides for the reduction or elemination of voids from the material.

Another object is to provide a novel process and means for feeding a plastic or semi-plastic mass of argillaceous material wherein the materials descend by gravity and wherein their movement is progressively restricted so that the materials pack due to their own weight in the bottom of the feeding means and are thus compacted.

Great physical and chemical changes are desired and time in some cases is an essential factor. To eliminate strains and stresses, brittleness, etc., the materials must be kept hot while time is permitted for the reactions to be completed. In some instances it is therefore desirable to temper, or to anneal, by "soaking" the material in heat for considerable periods immediately before molding it to final form, and it is a further object of the invention to provide a process and feeding means whereby this is accomplished.

One embodiment of apparatus whereby these objects are attained has been illustrated in the accompanying drawing, but it is to be expressly understood that the said drawing is for purposes of illustration only and is not to be construed as a definition of the limits of the invention, reference being had to the appended claims for this purpose.

In said drawing:

Fig. 1 shows in section an elevation of apparatus embodying the invention; and

Fig. 2 is a section of said apparatus at right angles to Fig. 1.

Referring to the drawing, a portion of a suitable heating device such as a rotary kiln is shown at 1, the end of the kiln being closed by a suitable door 2 through which is an opening 3 for the passage of the hot argillaceous materials to be treated. As shown, means are provided for mechanically working the materials and to this end a pair of rolls 4 are positioned to receive the hot materials leaving the kiln. The rollers 4 compact and densify the materials, reducing or eliminating voids therein, and deliver the worked materials to the feeding apparatus hereinafter described. However, it is to be expressly understood that said feeding apparatus may be employed either with or without the use of mechanical working devices such as the rolls 4 and that any suitable kind of heating means may be employed whereby the materials may be brought to a temperature at which the mass becomes plastic or semi-plastic but not fused.

The present invention provides means for feeding or delivering the hot materials, whether preliminarily worked or not, to position for further disposition such as molding, etc., whereby said materials are maintained in a hot plastic or semi-plastic mass preferably for considerable periods, and are delivered to said position substantially free from voids. Said feeding means with these ends in view embodies a vertical or substantially vertical passage for the hot material, which may if desired be constricted in cross-section at its discharge opening or adjacent its lower end so as to restrict the passage of the hot materials therethrough, said passage having sufficient vertical extent that said materials are packed or compressed adjacent the bottom of the passage under substantial pressure due to their own weight. Preferably suitable means are likewise provided for heating the materials in the passage to maintain them in a plastic or semi-plastic state and means are provided to facilitate the escape of air and gases from the mass of materials in said passage.

In the form shown in the drawing, said feeding means embodies walls 5, preferably of suitable refractory material, which form a substantially vertical passage 6 that as shown is rectangular in cross-section, although it may have any other suitable configuration. Adjacent its upper portion, said passage 6 may be substantially square in cross-section and its cross-section may be decreased in one direction only toward its bottom to form a narrow elongated discharge opening 7. It will be understood, however, that the shape of the passage 6 and of the discharge opening 7 may be varied to suit the purpose for which the feeder is to be employed, and further that the passage 6 need not be constricted where this is not desirable.

To restore heat lost by the materials during rolling when rolls 4 are employed, and to maintain the materials in a hot plastic or semi-plastic state while in the feeder, any suitable heating means may be employed. As shown, a suitable burner 8 is positioned adjacent the top of the feeder, said burner employing gas, powdered coal, etc., as fuel. Preferably the walls 5 of the passage 6 are likewise heated by means external to said passage and as shown, outer walls 9 surround the walls 5 and provide a heating chamber wherein a plurality of burners 10, preferably ring-shaped, are provided. The top of the feeder is preferably closed by a suitable door or the like 11 to prevent cooling of the materials in passage 6, said door being provided with an opening 12 through which the hot materials are delivered to the feeder.

In order to facilitate the escape of air, gases and the like from the mass of materials in passage 6, the walls 5 may be provided with suitable openings 13 that are preferably inclined in a direction to prevent the escape of materials therethrough from the passage 6, or in other words, are inclined upwardly and outwardly. Any suitable number and arrangement of such openings may be provided.

Any desired disposition may be made of materials leaving the discharge opening 7, but for purpose of illustration, said materials fall onto a travelling surface 14 which may comprise a belt, molds, cars or the like, and are rolled out flat on said surface by suitable means such as a pressure roller 15.

The heated materials from kiln 1 are discharged through opening 3 to the compacting rolls 4, where these are employed, and then through opening 12 into the vertical passage 6. When used, the rolls work the materials to compact and densify the same, altering and reducing the voids therein. The materials descend by gravity in said passage and owing to the restricted cross-section of the same adjacent its bottom, said materials are packed in the passage under substantial pressure due to their own weight. The constriction of the passage through which the materials pass tends to further compact and densify the material, altering and reducing the voids therein and facilitating the escape of gas and air, with a resultant production of a more homogeneous and compact material. Materials at the top of the passage, as they enter the feeder, are heated by burner 8 so that any heat lost by the material in passing from kiln 1 to the feeder is restored and the materials are maintained in a plastic or semi-plastic state. Adjacent the bottom of the passage 6, the walls 5 and the materials within the passage are kept hot by the burners 10 so that the materials while being compressed or compacted are at the same time "steeped" or "soaked" in heat. Any gases which may form in the material, any air from air pockets or the like, etc., can escape from the passage through the openings 13 which as above pointed out are so inclined that the materials do not escape therethrough. The mass of material discharged through opening 7 is thus uniformly heated throughout, compact and free from voids so that the resulting products formed by roll 15 are uniformly dense, hard and compact.

While only one embodiment of the invention has been illustrated in the drawing, it is to be expressly understood that said drawing is for purposes of illustration only and that the invention is capable of a variety of mechanical embodiments, while changes may be made in the form, details and arrangement of the parts without departing from the spirit of the invention. Reference is therefore to be had to the appended claims for a definition of the limits of the invention.

What is claimed is:

1. In an apparatus for producing articles of argillaceous materials heated to a plastic or semi-plastic but not completely fused condition, in combination with means for forming said materials, means for advancing said materials to said forming means in their heated and plastic or semi-plastic but not completely fused condition, including a substantially vertical feeding passage, said passage having sufficient vertical extent that said materials pack together in said passage due to their own weight to reduce voids in the mass of materials.

2. In an apparatus for producing articles of argillaceous materials heated to a plastic or semi-plastic but not completely fused condition, in combination with means for forming said materials, means for advancing said materials to said forming means in their heated and plastic or semi-plastic but not completely fused condition, including a vertically disposed feeding device which decreases in cross sectional area toward its bottom, and means for discharging said hot materials into the top of said device whereby they descend by gravity through the same, said passage being of sufficient vertical extent so that said materials pack toward its bottom and reduce the voids in said materials.

3. In an apparatus for producing articles of argillaceous materials heated to a plastic or semi-plastic but not completely fused condition, in combination with means for forming said materials, means for advancing said materials to said forming means in their heated and plastic or semi-plastic but not completely fused condition, including a vertically disposed feeding device which decreases in cross sectional area toward its bottom, means for discharging said hot materials into the top of said device whereby they descend by gravity through the same, said passage being of sufficient vertical extent so that said materials pack toward its bottom and reduce the voids in said materials, and means for heating the packed materials in said feeding device.

4. In an apparatus for producing articles of argillaceous materials heated to a plastic or semi-plastic but not completely fused condition, in combination with means for forming said materials, means for advancing said materials to said forming means in their heated and plastic or semi-plastic but not completely fused condition, including a feeding device having walls forming a passage decreasing in cross section toward the bottom of said device and leaving a discharge opening at its bottom, said passage being of sufficient height that said plastic materials pack together toward the bottom thereof, means for heating said materials in said passage, and means whereby air and gas in said mass escape from said passage.

5. In an apparatus for producing articles of argillaceous materials heated to a plastic or semi-plastic but not completely fused condition, in combination with means for forming said materials, means for advancing said materials to said forming means in their heated and plastic or semi-plastic but not completely fused condition, including a heating device comprising walls forming a substantially vertical feeding passage decreasing in cross section toward its bottom, said passage having sufficient vertical extent that said materials are compacted toward the bottom thereof, walls surrounding said walls and forming therewith a heating chamber surrounding said passage, and heating means positioned in said chamber for maintaining the materials in said passage in their heated but unfused condition.

6. In an apparatus for producing articles of argillaceous materials heated to a plastic or semi-plastic but not completely fused condition, in combination with means for forming said materials, means for advancing said materials to said forming means in their heated and plastic or semi-plastic but not completely fused condition, including a heating device comprising walls forming a substantially vertical feeding passage decreasing in cross section toward its bottom, said passage having sufficient vertical extent that said materials are compacted toward the bottom thereof, walls surrounding said walls and forming therewith a heating chamber surrounding said passage, said first named walls being provided with inclined openings for the escape of air and gas from said passage to said chamber, and heating means positioned in said chamber for maintaining the materials in said passage in their heated but unfused condition.

7. A process for treating a hot plastic or semi-plastic mass of argillaceous materials which comprises disposing the loose hot materials in a vertical stack or pile of sufficient vertical extent that said materials are compacted due to their own weight, while maintaining the temperature of the mass for a substantial period to temper the materials, and then molding said materials.

8. A process for making articles of argillaceous materials which comprises heating a mass of said materials to a temperature at which the mass becomes somewhat plastic but is not completely fused, maintaining the temperature of the mass for a substantial period to temper the hot materials, and molding said materials.

9. A process for making articles of argillaceous materials which comprises heating a mass of said materials to a temperature at which the mass becomes somewhat plastic but is not completely fused, piling the materials vertically to a height sufficient to compact the materials under their own weight and to eliminate voids therein, and molding the materials.

10. A process for making articles of argillaceous materials comprising heating a mass of said materials to a temperature at which the mass becomes somewhat plastic but is not completely fused, working said materials to reduce the voids therein, feeding said materials while constricting the same thereby tending to eliminate such voids, and then molding said materials.

11. A process for making articles of argillaceous materials comprising heating a mass of said materials to a temperature at which the mass becomes somewhat plastic but is not completely fused, feeding and constricting said materials through a sufficient vertical extent to compact the materials by reducing and eliminating voids therein, and molding the materials.

12. A process of making articles of argillaceous material which consists in heating a mass of said material to a temperature at which the mass becomes somewhat plastic but is not completely fused, working said material to reduce the voids therein, accumulating said worked material vertically and constricting said material adjacent the lower portion thereof during feeding to molding position to compact the mass by the action of gravity, and molding said material.

In testimony whereof I have signed this specification.

WILLIAM B. PINE.